United States Patent [19]

Yoshioka

[11] 4,399,617
[45] Aug. 23, 1983

[54] HEIGHT GAGE

[75] Inventor: Susumu Yoshioka, Utsunomiya, Japan

[73] Assignee: Mitutoyo Mfg. Co., Ltd., Tokyo, Japan

[21] Appl. No.: 310,680

[22] Filed: Oct. 13, 1981

[30] Foreign Application Priority Data

Oct. 24, 1980 [JP] Japan ............................ 55-151953[U]

[51] Int. Cl.³ .............................................. G01B 7/00
[52] U.S. Cl. ..................................... 33/169 R; 33/170
[58] Field of Search ............. 33/169, 170, 171, 172 R, 33/172 B

[56] References Cited

U.S. PATENT DOCUMENTS

| | | |
|---|---|---|
| 3,055,114 | 9/1962 | DeBoer et al. ................ 33/171 X |
| 3,279,079 | 10/1966 | Schiler ........................... 33/169 R |
| 3,570,796 | 3/1971 | Capps ............................. 33/172 B |
| 3,924,337 | 12/1975 | Taylor ............................ 33/169 R |

FOREIGN PATENT DOCUMENTS 425247   4/1964   Switzerland ..................... 33/169 R

*Primary Examiner*—Harry N. Haroian
*Attorney, Agent, or Firm*—Flynn, Thiel, Boutell & Tanis

[57] ABSTRACT

A height gage having a cylindrical column supporting a slider vertically movably thereon.

The slider vertically movable to the column is restricted from rotation by a scale vertically extended along the column and the slider is connected by way of string members to a balance weight provided in the column so as to facilitate the slider operation. Air jetting ports are formed to the bottom surface of a base having the column erected upright thereon, so as to form a pneumatic bearing between the base and the substrate for mounting the height gage to facilitate gage movement.

9 Claims, 6 Drawing Figures

HEIGHT GAGE

BACKGROUND OF THE INVENTION

1. Field of the Invention

This invention concerns a height gage for use in measurement of height or scribing work on articles from the sliding distance of a slider unit supported on a column.

2. Description of the Prior Art

Conventional height gages known so far include a type using a flat plate of a rectangular cross section for the support of a slider unit. Since the column has the rectangular cross section in the height gage of this type, horizontal rotation of the slider unit is restricted thereby enabling inhibition of horizontal displacement between the main scale on the column and the vernier scale on the slider unit. However, the rectangular profile of the column makes it somewhat inevitable to result in torsions in the direction perpendicular to its width, that is, along the plate thickness of the column. Further, smooth and flat machining at high accuracy is required for each of the column surfaces, which presents a difficulty in the fabrication of the column.

In order to overcome the foregoing drawbacks, rod or pipe-like members of elliptic configuration have been employed at present for the columns, and the slider unit has been supported on at least two such columns for preventing the horizontal rotation of the former to the latter. In the provision of the two columns, however, they have to be assembled in parallel with each other since the slider unit can not otherwise be supported vertically movably on the columns. This requires skilled techniques and worsens the efficiency of the assembling work.

SUMMARY OF THE INVENTION

An object of this invention is to provide a height gage capable of facilitating the column assembling work.

Another object of this invention is to provide a height gage requiring no additional means for restricting the rotation of a slider unit.

The foregoing objects can be attained in accordance with this invention, wherein a column of a circular cross section is used to facilitate the column assembling work and a vertically extended scale mounted on a circular column or the mounting face for the scale is used to restrict the circumferential rotation of a slider unit to the column.

DETAILED DESCRIPTION OF THE PREFERRED EMBODIMENT

Figure 1:
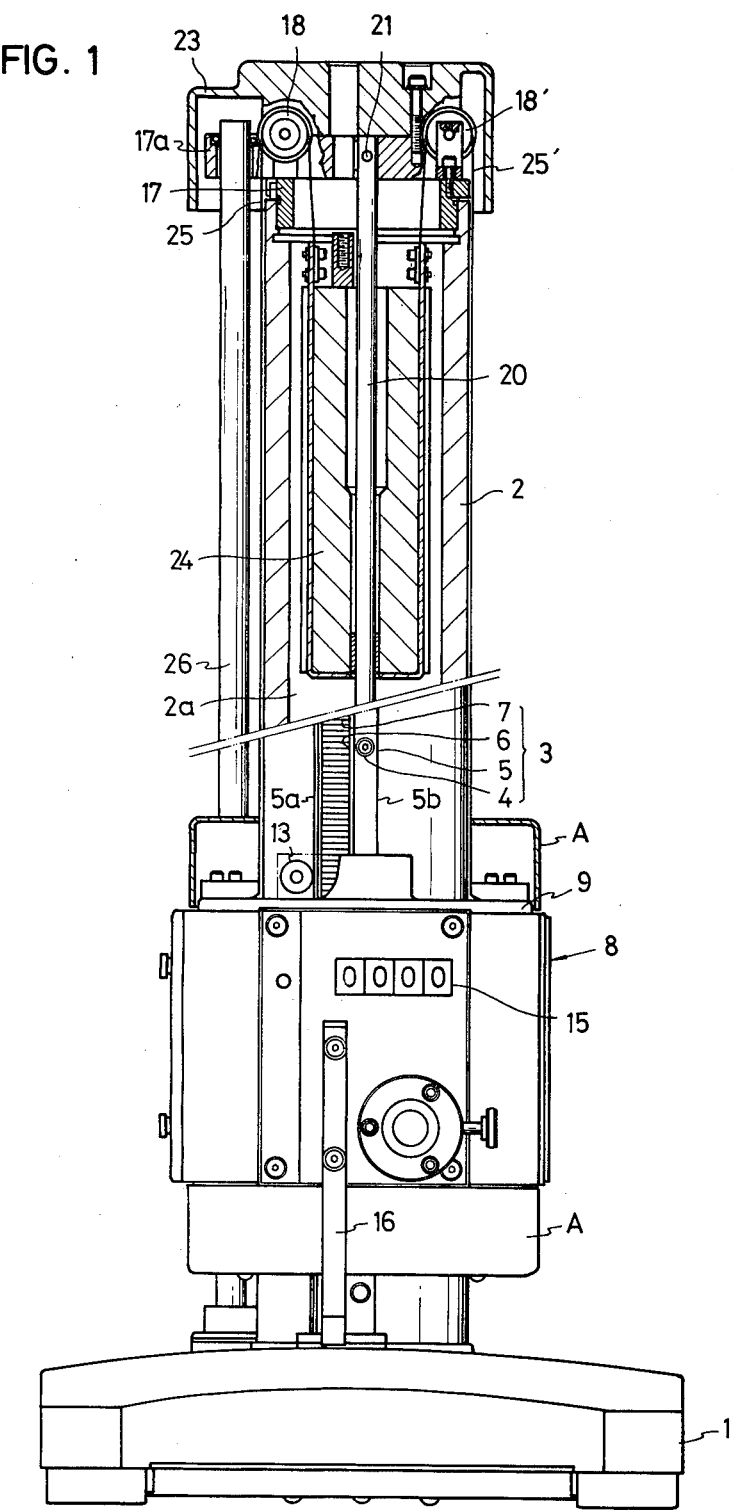
FIG. 1 is a front elevational view for a part of an embodiment, with the upper half being in cross section, of a height gage according to this invention.
Figure 2:
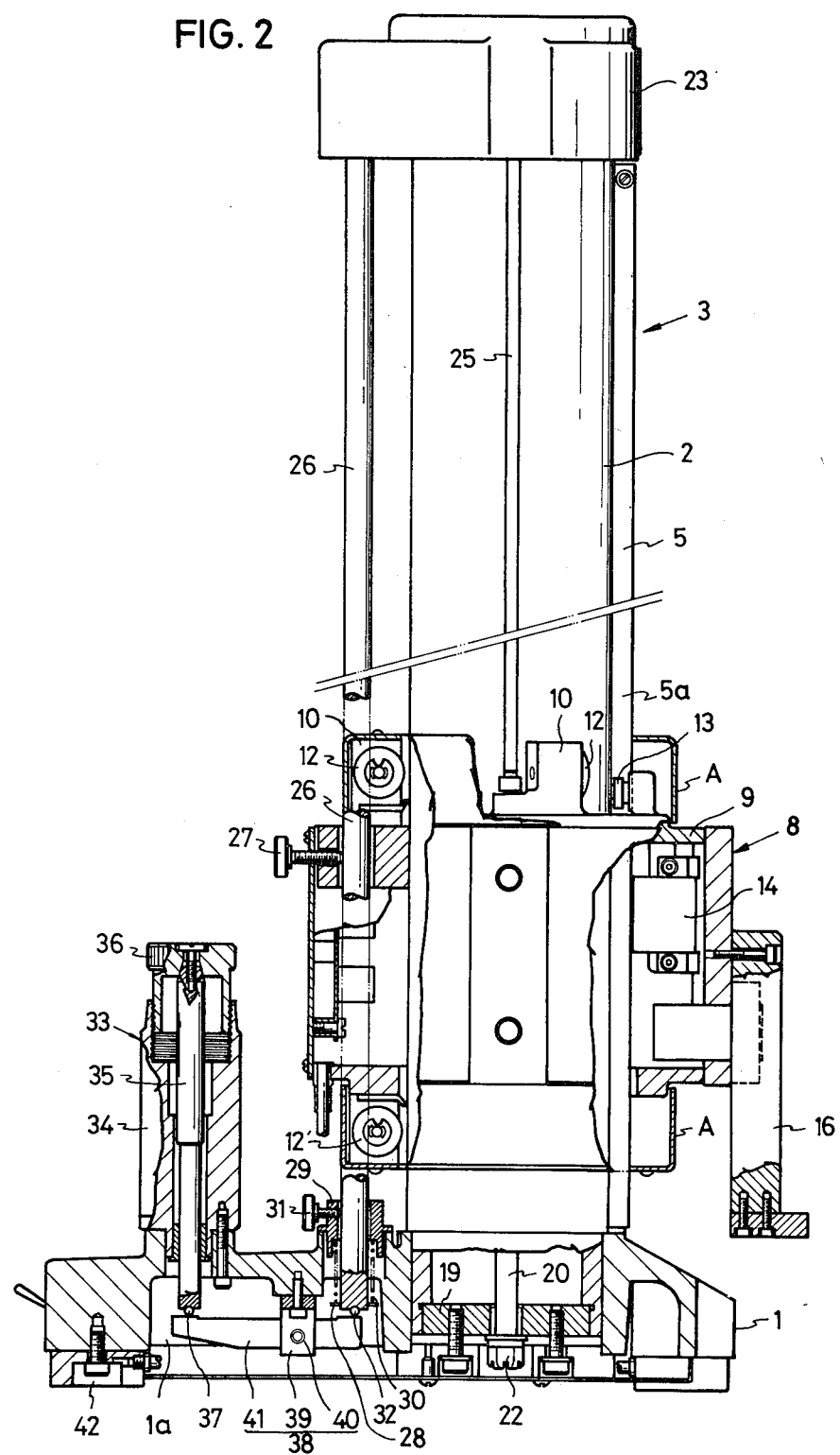
FIG. 2 is a side elevational view, with the lower half being in cross section, of the height gage shown in FIG. 1.

In FIG. 1 and FIG. 2, a base 1 has a space 1a opening downwardly. A column 2 erected upright securely on the base 1 is made of a hollow cylindrical member (pipe) of a circular cross section and defines in its inside a vertically extending space 2a (refer to FIG. 1 and FIG. 3).

A scale 3 extending vertically is secured on the outer surface of the column 2. The scale 3 has a scale holder 5 secured at several position to the column 2 by means of bolts 4 (refer to FIG. 1), and a scale plate 7 appended within the vertical groove 6 of the scale holder 5. The scale plate 7 has graduations indented thereon with $\mu$m pitch.

Figure 3:
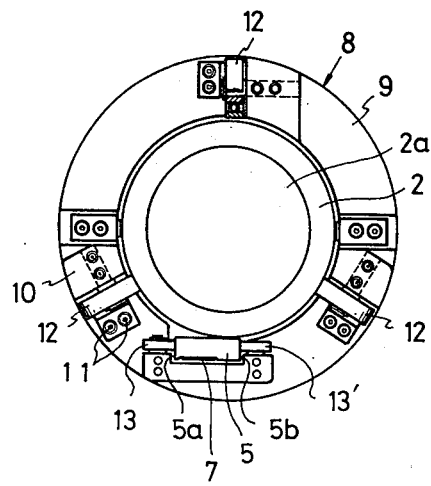
FIG. 3 is a plan view for a part of the slider and the column in FIG. 1 showing the relation therebetween.

A slider 8 is supported vertically movably on the column 2 and it comprises a cylindrical slider main body 9 loosely engaged to the outer circumference of the column 2 and roller holders 10 mounted to the slider main body 9 at 120° intervals (refer to FIG. 3). The roller holder 10 is mounted by means of bolts 11 to the slider main body 9 so that it may retractably protrude along the column 2. Rollers 12 are rotatably held to the roller holders 10 in rolling contact with the outer surface of the column 2. While FIG. 1 and FIG. 3 shows only the rollers 12 on the upper side of the slider main body 9, such rollers are also disposed at the lower side of the slider main body 9. FIG. 2 shows the roller 12' as one of the rollers on the lower side and, actually, the rollers are also provided at three points as are the rollers 12. In the drawing, reference A represents covers.

As shown in FIG. 3, the slider 8 is fixed against rotated by the slider main body 9 which has a pair of rollers 13, 13' abutting against both side faces 5a, 5b of the scale holder 5. These rollers 13, 13' hold the scale holder 5 therebetween from right and left to restrict the slider 8 from rotating in the circumferential direction of the column 2. Thus, the scale holder 5 and rollers 13 and 13' here constitute means for preventing the rotation of the slider 8.

Figure 4:
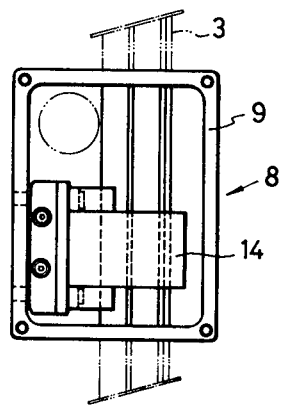
FIG. 4 is a schematic front elevational view for the structure of the scale reading unit shown in FIG. 2.

As shown in FIG. 4, a scale reading unit 14 of a photoelectric type is mounted to the slider main body 9. The scale reading unit 14 comprises a light emitting device (not shown) for applying light on the scale plate 7 and a light receiving device (not shown) for receiving the light issued from the light emitting device and reflected by the scale plate 7 by way of a slit plate or a transparent scale plate. Changes in the dark and brightness of the light sensed by the light receiving device are converted into electrical signals, which are counted and then displayed electrically on a digital display 15 provided to the slider main body 9 (refer to FIG. 1).

A scriber (or a bracket for mounting scriber pin) 16 is mounted on the slider main body 9 (refer to FIG. 1 and FIG. 2).

Figure 5:
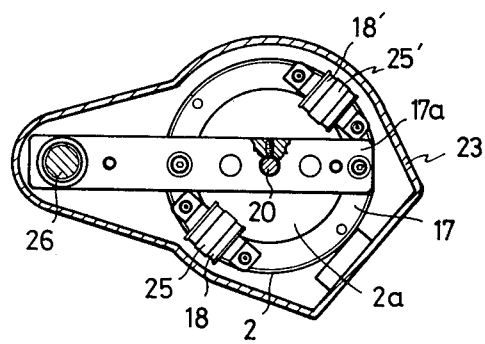
FIG. 5 is a cross section showing the relation between the ring at the upper part of the column and the plate member shown in FIG. 1 and FIG. 2.

A ring 17 is fitted to the upper end of the column 2 (refer to FIG. 1 and FIG. 5) and rollers 18 and 18' are rotatably supported on the ring 17. In FIG. 2, reference 19 represents an end plate for closing the lower end of the column 2. A guide rod 20 extending vertically is disposed along the axial center of the space 2a in the column 2. The guide rod 20 is secured at the upper end by means of a pin 21 to a plate member 17a fixed to the ring 17 and passes at the lower end through the end plate 19. A fixing nut 22 is threadingly engaged over the lower end of the guide rod 20 to fix it to end plate 19.

Reference 23 represents a cover mounted detachably to the ring 17.

Within the space 2a, is loosely disposed a cylindrical balance weight 24 vertically movably in sliding contact over the guide rod 20 (refer to FIG. 2). The balance weight 24 is connected to the slider 8 by way of strings 25, 25' carried on the rollers 18, 18'. The strings 25, 25' are composed, for example, of thin metal tape, wire or the like.

As shown in FIG. 2, a fine adjusting rod 26 disposed in parallel with the column 2 passes through the slider main body 9 vertically movably, and is held at its upper end vertically movably to the plate member 17a and is held at its lower end also vertically movably to the base 1. The slider 8 is adapted so that it can be fixed at an optional position on the fine adjusting rod 26 by means of a set screw 27 threaded into the slider main body 9 as a fixing means. The lower end of the fine adjusting rod 26 projects to the space 1a and a retainer 28 is provided near the lower end. A spring 30 is mounted between the retainer 28 and a bush 29 mounted on the upper portion of the base 1, and is biased the fine adjusting rod 26 downwardly. A set screw 31 threaded into the bush 29 sets the fine adjusting rod 26 on the base 1. Reference 32 represents a ball held at the lower end of the fine adjusting rod 26.

A fine adjusting screw mechanism 33 is mounted to the base 1 (refer to FIG. 2). The fine adjusting screw mechanism 33 comprises; a sleeve 34 mounted on the base 1, a spindle 35 supported to the sleeve 34 vertically movably, a handle knob 36 solidly secured at the upper end of spindle 35 by a set bolt and threaded into the upper end of the sleeve 34, and a ball 37 held at the lower end of the spindle 35.

A lever mechanism 38 is disposed between the ball 37 of the fine adjusting screw mechanism 33 and the ball 32 at the lower end of the fine adjusting rod 26. The lever mechanism 38 comprises; a holder 39 mounted to the base 1, a pin 40 held in the holder 39, and a lever 41 rotatably held to the holder 39 by way of the pin 40. The lever 41 is abutted at its both arm ends against the balls 32 and 37 respectively and the arm length to the abutting position for the ball 37 is set greater than the arm length to the abutting position for the ball 32.

Figure 6:
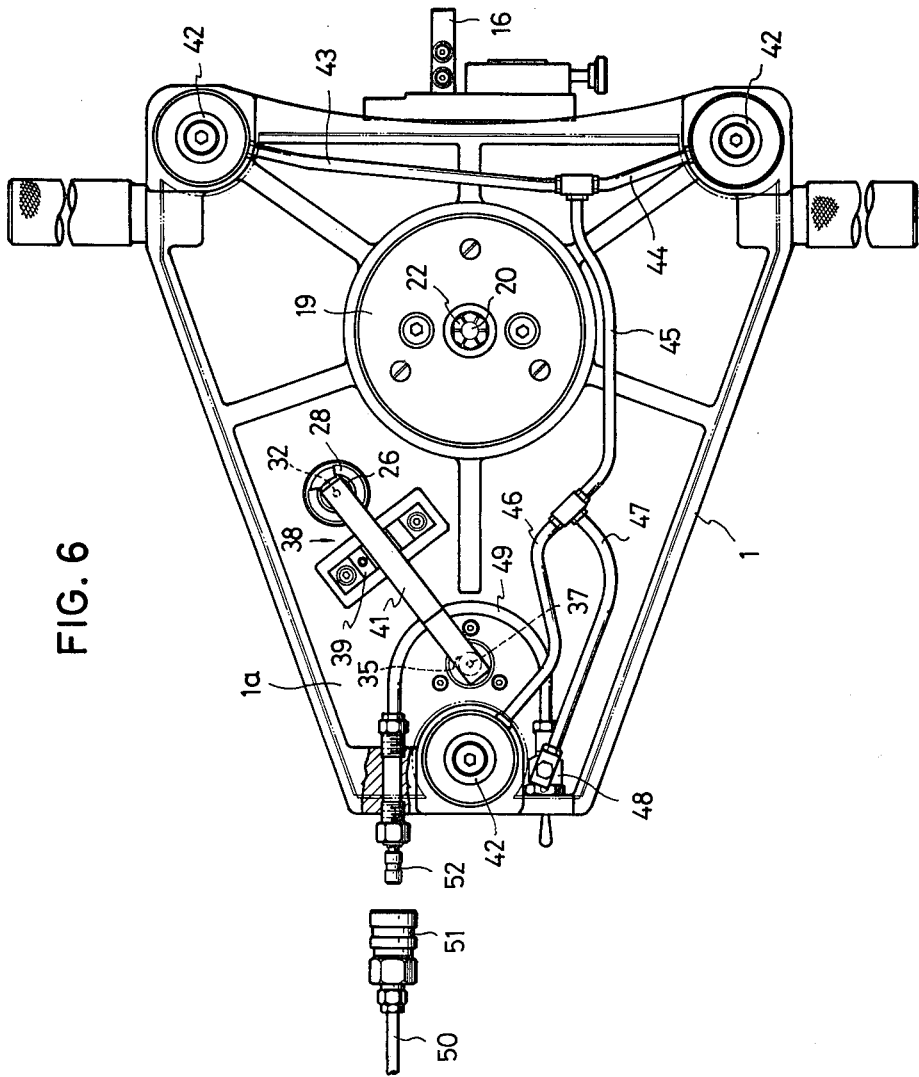
FIG. 6 is a bottom view for the base of the height gage shown in FIG. 1.

As shown in FIG. 2 and FIG. 6, the base 1 is formed with air jetting ports 42 opening to the bottom end and the ports 42 are provided at three positions (FIG. 6). To each of the air jetting ports 42, is connected a pipe 47 by way of pipes 43, 44, 45, 46, etc. and the pipe 47 is further connected by way of an ON-OFF valve 48 to a pipe 49. The pipe 49 is connected to an air supply hose 50. Reference 51 is a connector and 52 is a juncture for the connector 51.

The operation for the height gage having such a constitution is to be explained.

Upon vertical operation to the slider 8, while loosening the set screw 27, the balance weight 24 is moved vertically by way of the strings 25, 25'.

Then, upon rotational operation to the handle knob 36 for the fine adjusting screw mechanism 33, with the slider 8 fixed to the fine adjusting rod 26 by means of the set screw 27 and the set screw 31 loosened, the threading position of the handle knob 36 on the sleeve 34 gradually changes slightly to finely move the spindle 35 vertically. The fine movement of the spindle 35 is transmitted by way of the ball 37, the lever 41 and the ball 32 to the fine adjusting rod 26 to cause a fine vertical movement in the fine adjusting rod 26. As the result, the slider 8 is finely moved vertically.

In this way, the slider 8 is slid vertically relative to the column roughly or finely, whereby the sliding distance of the slider 8 is read as a relative displacement between the scale 3 and the scale reading unit 14 and the amount of the displacement is displayed on the digital display 15.

The horizontal movement of the height gage is conducted by the following procedures. At first, the connector 51 is connected to the juncture 52 to supply pressurized air through the hose 50 to the pipe 49 and, thereafter, the ON-OFF valve 48 is opened, whereby pressurized air supplied by way of the air supply hose 50 to the pipe 49 and then by way of the pipes 47, 46, 45, 44 and 43 to each of the air jetting ports 42, 42, 42 and jetted therefrom. The jetted air forms a thin air layer between the base 1 and the surface plate or the like carrying the height gage thereon to slightly float up the height gage. Then, in this state, the height gage is moved horizontally by handling the sleeve 34 of the fine adjusting screw mechanism 33. Since no frictional force is present between the base 1 and the substrate or the like, small operational force is sufficient for the movement.

According to the embodiment as described above, since the column 2 consists of one circular column, the column 2 can be assembled by merely securing it in perpendicular to the bottom surface of the base 1, whereby the assembling work for the column 2 can be facilitated.

Further, since the circumferential rotation of the slider 8 to the column 2 is restricted by the use of the vertically extending scale 3 mounted on the circular column 2, no additional means is required for restricting the rotation of the slider 8 and since the column 2 is made of a circular cylindrical pipe, the entire weight thereof can be reduced while maintaining a predetermined strength, which can prevent the column 2 from deformation upon movement of the slider 8, making it possible to maintain high accuracy.

Further, balancing for the slider 8 by the use of the balance weight 24, enables one to move the slider 8 vertically with a slight operational force. In addition, insertion of the balance weight 24 into the space 2a within the column 2 retains the balance weight 24 from projecting externally, thereby avoiding a hindrance to the measurement, and eliminates the requirement for additional space for containing the balance weight 24.

Further, since the slider 8 is moved vertically by way of the fine adjusting rod 26 provided in parallel therewith and capable of fine adjustment, the fine adjustment for the slider 8 can be carried out at a constant position.

Further, since the fine adjusting rod 26 is operated finely by way of the fine adjusting screw mechanism 33 and the lever mechanism 38, the fine adjustment for the slider can be conducted with little force. This is attributable also to the fact that the weight of the balance weight 24 is exerted on the slider 8 also in the case of the fine adjustment.

Further, since the fine adjusting screw mechanism 33 protrudes above the base 1, the sleeve 34 for the fine adjusting screw mechanism 33 can be used as a grip upon movement of the height gage.

Furthermore, since the air jetting ports 42 are formed in the lower surface of the base 1 and pressurized air supplied from the hose 50 can be jetted out therefrom, a so-called pneumatic bearing can be formed to the lower surface of the base 1 thereby enabling smooth movement of the height gage.

Although this invention has been described referring to the embodiment shown in the drawings, other modifications or changes are of course possible. For instance, the scale 3 and the scale reading unit 14 are not restricted only to the light reflection type but various types of linear encoders may be utilized such as of light transmission type, magnetic scale type and electromagnetic coil type. Further, the scale 3 is not necessarily be mounted directly to the outer surface of the column 2 but it may be mounted on a vertically extending plane for mounting column which is formed by machining or the like to the outer surface of the column 2. In this case, the plane or the side of the plane may be utilized as a stopper for the rotation of the slider 8. However, it is advantageous in view of cost, strength and accuracy to secure the scale 3 directly on the circular column 2 and utilize the side faces of the scale 3 as the rotational stopper as stated previously since the column 2 can then be formed as a complete cylinder with no plane portion on the outer surface. Furthermore, although the fine adjusting screw mechanism 33 may be provided on the upper or the lower part of the column 2, it is advantageous to provide it on the base 1 since no additional force is then exerted on the column 2.

What is claimed is:

1. A height gage comprising: a base; a hollow cylindrical column upwardly erected on said base; a vertically extended scale secured to the outer surface of said column and provided thereon with graduations of $\mu m$ order; a slider slidably coupled to said column and having a detector opposed to and in non-contact with said scale; means for preventing the rotation of said slider in the circumferential direction of said column as referenced from said scale; a balance weight connected to said slider and slidably inserted into said column; a fine adjusting rod disposed parallel to said column and vertically fixable and releasable with respect to said slider, said fine adjusting rod being vertically movably mounted with respect to said column; and a fine adjusting screw mechanism adapted to finely move said fine adjusting rod, said fine adjusting screw mechanism projecting upwardly from said base for engagement to horizontally move said gage as a whole.

2. A height gage as set forth in claim 1, wherein three laterally widely spaced air jetting ports are formed in the bottom face of the base.

3. A height gage as set forth in claim 1, wherein said scale comprises an at least partially reflective scale plate, and said detector comprises a scale reading means for irradiating the scale plate with light and receiving the light reflected by said scale plate to thereby form a light reflecting type height gage.

4. A height gage as set forth in claim 1, wherein said slider is axially slidably guided on said column by a plurality of rollers rotatably supported on said slider and is independently prevented from rotation by a further opposed set of rollers bearing on opposite sides of a scale plate fixed on said column lengthwise.

5. A height gage as set forth in claim 1, wherein said balance weight is guided by a guide rod secured in said column, and said slider and said balance weight are connected to each other through beltlike strings.

6. A height gage as set forth in claim 1, wherein said rod is downwardly biased by a spring and upwardly, finely moved by a lever mechanism.

7. A height gauge as set forth in claim 6, wherein said lever mechanism is driven by said fine adjusting screw mechanism.

8. A height gage as set forth in claim 1, wherein said fine adjusting screw mechanism is affixed to the base in parallel to said column.

9. A height gage as set forth in claim 8, including a handle knob formed with fine adjusting threads for finely adjusting said fine adjusting screw mechanism.

* * * * *